United States Patent [19]

Lichti et al.

[11] Patent Number: 5,119,691

[45] Date of Patent: Jun. 9, 1992

[54] HYDRAULIC PHASERS AND VALVE MEANS THEREFOR

[75] Inventors: Thomas H. Lichti; Michael J. Niemiec, both of Rochester, N.Y.

[73] Assignee: General Motors Corporation, Detroit, Mich.

[21] Appl. No.: 559,243

[22] Filed: Jul. 27, 1990

Related U.S. Application Data

[63] Continuation-in-part of Ser. No. 418,019, Oct. 10, 1989, abandoned, and a continuation-in-part of Ser. No. 418,018, Oct. 10, 1989, Pat. No. 5,033,327.

[51] Int. Cl.$^5$ .............................................. F01L 1/34
[52] U.S. Cl. ............................ 74/568 R; 74/567; 123/90.17
[58] Field of Search ................... 74/567, 568 R; 123/90.17, 90.15, 90.31; 464/1, 2, 24, 60

[56] References Cited

U.S. PATENT DOCUMENTS

| 1,531,909 | 3/1925 | Engemann . | |
|---|---|---|---|
| 3,545,296 | 12/1970 | Eggins | 74/410 |
| 3,603,112 | 9/1971 | Sola | 64/25 |
| 4,164,917 | 8/1977 | Glasson | 123/90.17 |
| 4,231,330 | 11/1980 | Garcea | 123/90.15 |
| 4,305,366 | 12/1981 | Imasato et al. | 123/502 |
| 4,305,367 | 12/1981 | Imasato et al. | 123/502 |
| 4,331,040 | 5/1982 | Swasey | 74/409 |
| 4,421,074 | 12/1983 | Garcea et al. | 123/90.15 |
| 4,535,731 | 8/1985 | Banfi | 123/90.15 |
| 4,601,266 | 7/1986 | Oldfield et al. | 123/90.15 |
| 4,627,825 | 12/1986 | Bruss et al. | 464/2 |
| 4,754,727 | 7/1988 | Hampton | 123/90.15 |
| 4,762,097 | 8/1988 | Baker | 123/90.17 |
| 4,787,345 | 11/1988 | Thoma | 123/90.17 |
| 4,811,698 | 3/1989 | Akasaka et al. | 123/90.17 |
| 4,865,465 | 8/1989 | Denz et al. | 123/90.17 |
| 4,889,086 | 12/1989 | Scapecchi et al. | 123/90.15 |
| 4,895,113 | 1/1990 | Speier et al. | 123/90.17 |
| 4,976,229 | 12/1990 | Charles | 123/90.31 X |
| 5,012,773 | 5/1991 | Akasaka et al. | 123/90.17 |

FOREIGN PATENT DOCUMENTS

| 0340821 | 11/1989 | European Pat. Off. | 123/90.17 |
|---|---|---|---|
| 0356162 | 2/1990 | European Pat. Off. . | |
| 58-77967 | 5/1983 | Japan | 74/409 |
| 0149708 | 6/1990 | Japan | 123/90.17 |
| 2019613 | 10/1979 | United Kingdom . | |
| 2157364 | 10/1985 | United Kingdom . | |

Primary Examiner—Vinh T. Luong
Attorney, Agent, or Firm—Robert J. Outland

[57] ABSTRACT

A variable camshaft phaser (VCP) has various embodiments and features including inner and outer helical splines for phase changing and return springs mounted in pockets to shorten overall length and relieve lash take-up friction on the piston return strokes. A three-way feed-discharge valve limits hydraulic actuating oil flow to that required to operate the drive pistons for phase changing operation. The three-way valve may be carried in a srew or fastener that secures the phaser to a camshaft or other rotary member.

6 Claims, 8 Drawing Sheets

HYDRAULIC PHASERS AND VALVE MEANS THEREFOR

CROSS-REFERENCE

This application is a continuation-in-part of copending U.S. patent application Ser. Nos. 07/418,019 (abandoned) and 07/418,018 (now U.S. Pat. No. 5,033,327 issued on Jul. 23, 1991) both filed Oct. 10, 1989.

TECHNICAL FIELD

This invention relates to phase adjusting drives and especially to camshaft phasing devices for varying the timing of valve actuation by an engine driven camshaft. The invention further relates to hydraulic systems with valve means for actuating such drives.

BACKGROUND

It is known in the art relating to engine valve gear to provide various means for varying valve timing as desired for the control of engine performance and efficiency. Among the various types of variable valve timing devices employed have been camshaft phasing devices, often in the form of drive pulleys and the like incorporating phase changing means for varying the phase between a rotatably driving input member such as a gear, pulley or sprocket and a rotatably driven output member such as a camshaft. Among the pertinent prior art are mechanisms having splined pistons which are hydraulically actuated against a spring to vary the phasing of outwardly and inwardly engaged drive and driven members. Such arrangements are shown for example in U.S. Pat. Nos. 4,231,330 Garcea and 4,811,698 Akasaka et al.

Garcea FIG. 1 and Akasaka et al FIG. 3 also disclose prior hydraulic systems for actuating phase adjusting devices. In these systems, the hydraulic actuator is continuously connected with the engine oil pressure system and a drain valve is used to control pressurization of the actuating chamber. When the drain valve is open, oil delivered to the actuator is drained to the sump or other oil source so the chamber is not pressurized and the device is not actuated until the drain valve is closed. Such systems are simple but have the disadvantage of requiring a continuous oil flow whenever the drain valve is open which decreases operating efficiency and may reduce engine oil system operating pressures or require a larger oil pump capacity than would otherwise be needed.

SUMMARY OF THE INVENTION

The present invention extends the concepts of the prior art to provide an especially compact and effective form of phase adjusting (or phasing) drive. In a preferred embodiment, the invention is used as a variable cam phaser (VCP) applied in an engine camshaft drive to vary the phase or timing of a driven camshaft relative to a driving member, such as a sprocket, pulley or gear, that is driven in timed relation to an engine crankshaft or the like.

The invention also provides an improved hydraulic system with valve means for actuating phase adjusters and other hydraulic devices in which efficiency is increased by limiting oil flow to that required to actuate the device and shutting off the flow when the hydraulic actuation is not required.

A feature of the invention is that multiple return springs engage one of a pair of axially spaced inwardly biased (toward one another) anti-backlash annular drive pistons in a manner to minimize anti-backlash friction during return motions of the pistons. An extremely compact assembly results from the arrangement in which the springs extend from a front cover through one of the pistons into engagement with the more distant of the two pistons.

A further feature is that wave spring washers are used with headed pins for biasing of the helically splined annular drive pistons toward one another to take up the backlash in a limited length assembly.

Still another feature is that a thin sheet oil seal is provided adjacent the inner piston having teeth closely fitted or conformed to the mating hub and shaft to minimize leakage of pressure oil past the drive pistons. The seal may be bonded to the pressure side of the inner drive piston. Additionally or alternatively, sealing may be aided by filling the valleys of the splines with a deformable material such as wax, epoxy, metal or plastic. Either sealing method is consistent with the intent of minimizing the length of the phasing means to provide a compact VCP.

Yet another feature is that a preferably three-way valve control of oil flow is provided which controls both the admission and exhaust of oil from an actuating chamber to limit the use of oil to that required to actuate the mechanism.

These and other features and advantages of the invention will be more fully understood from the following description of certain specific embodiments of the invention taken together with the accompanying drawings.

DETAILED DESCRIPTION

Figure 1:
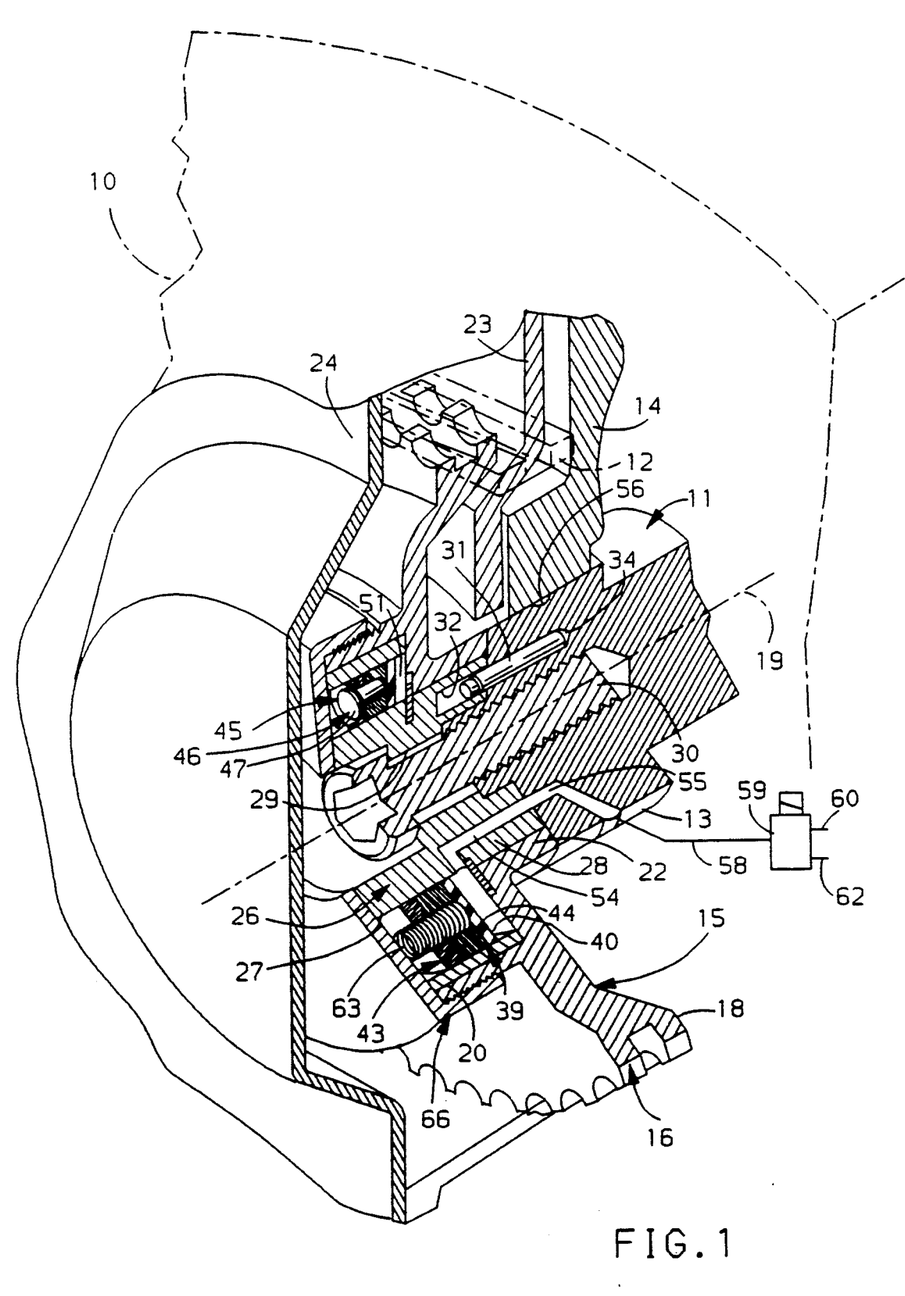
FIG. 1 is a pictorial view in partial cross section of an engine with installed variable cam phaser (VCP) according to the invention for use with a chain drive.
Figure 2:
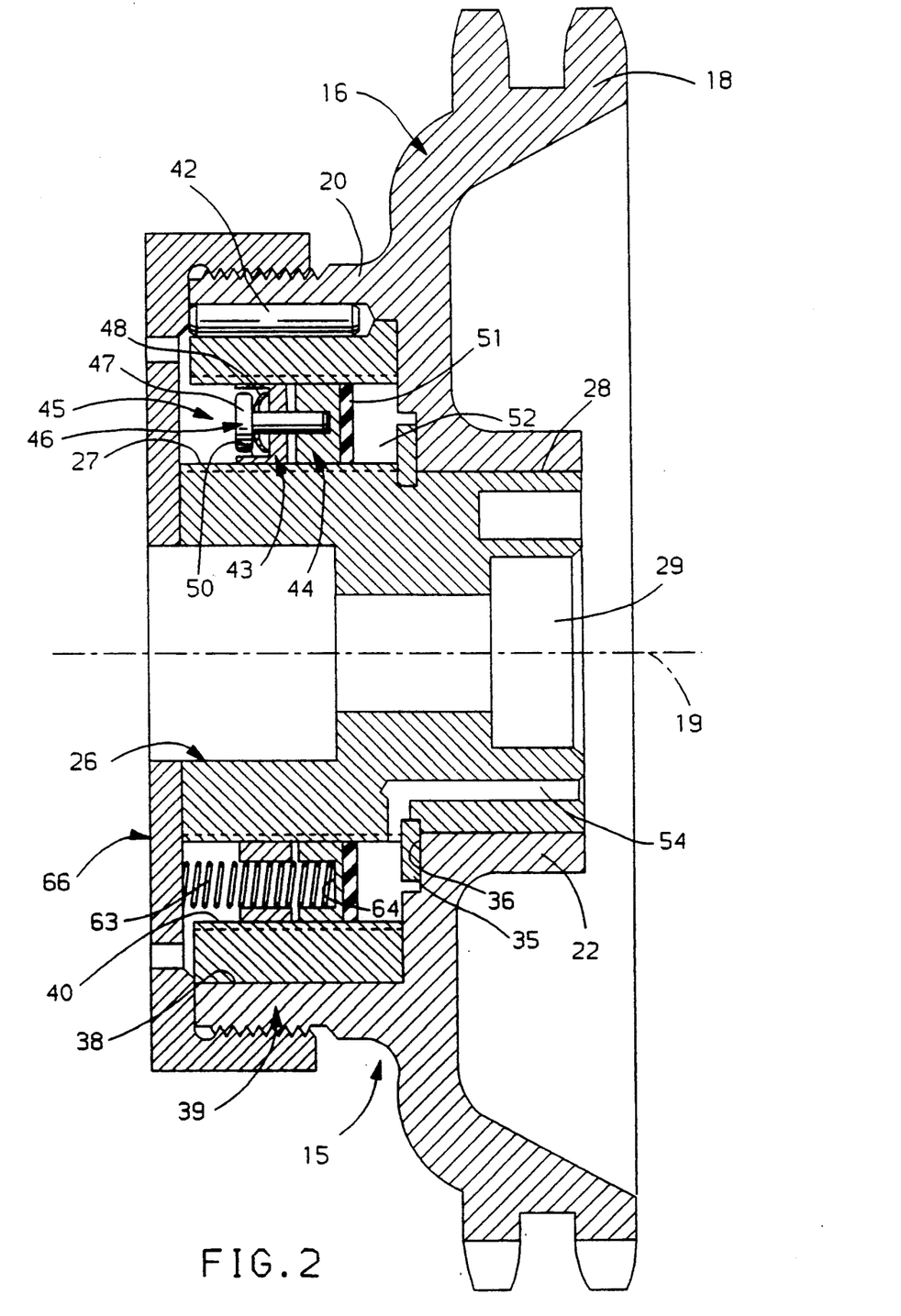
FIG. 2 is a cross-sectional view of a VCP essentially like that of FIG. 1.
Figure 3:
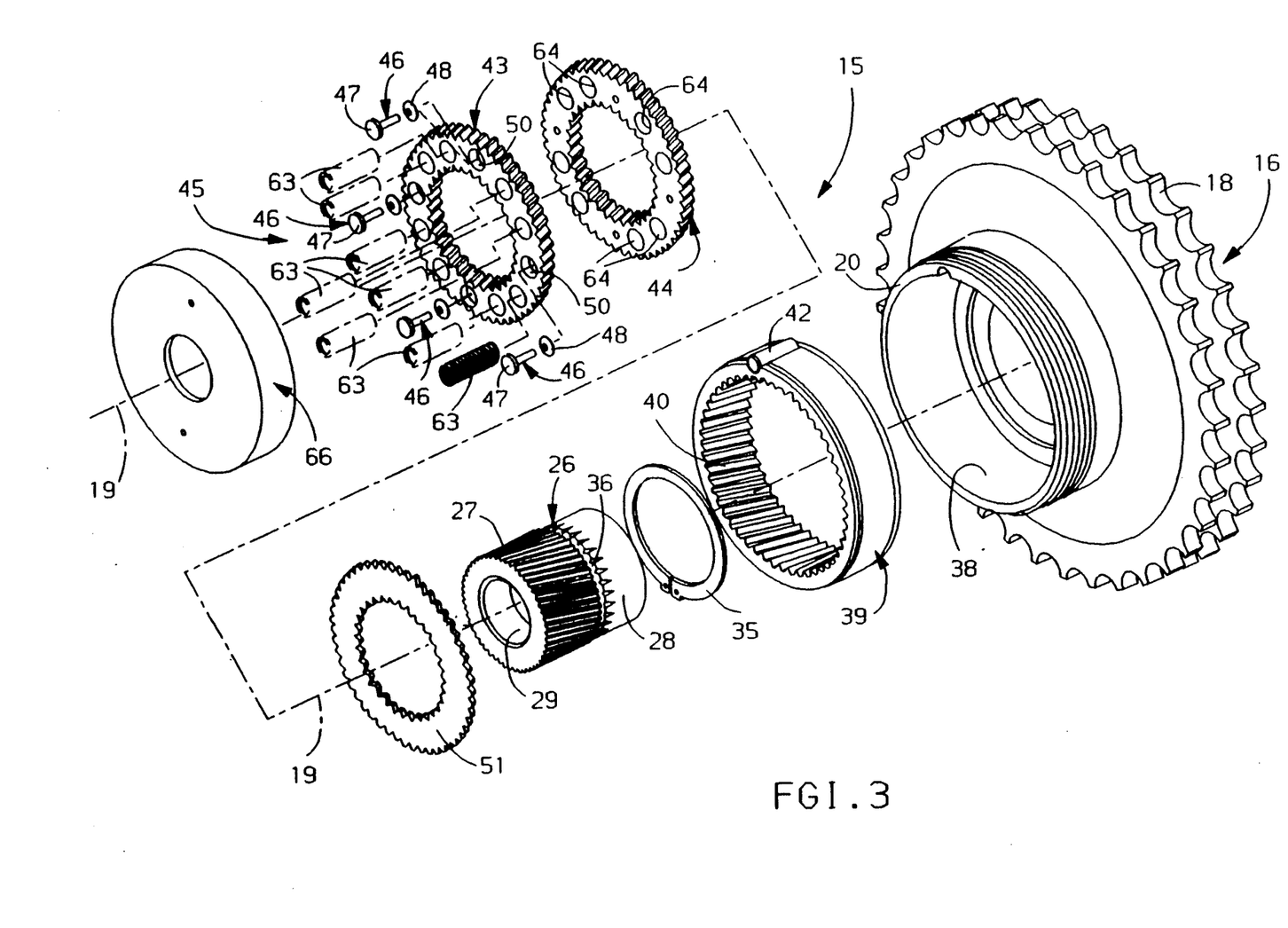
FIG. 3 is an exploded pictorial view of the VCP of FIG. 2.

Referring first to FIGS. 1-3 of the drawings in detail, numeral 10 generally indicates an internal combustion engine of a type having a camshaft 11 driven by a crankshaft, not shown, through a chain 12 or other suitable drive means. The camshaft 11 carries a plurality of cams (not shown) for actuating the cylinder intake and/or exhaust valves (not shown) of the engine in known manner. It is supported in part by an enlarged front bearing journal 13 that is carried in a suitable bearing within the front wall 14 of the engine cylinder head or camshaft carrier.

On the front, or driven, end of the camshaft there is a phase adjuster or variable cam phaser (VCP) 15 that includes a sprocket 16. The sprocket comprises a drive member with a peripheral drive portion, or wheel 18, that is toothed and is drivably engaged by the chain 12 for rotatably driving the sprocket 16 on an axis 19 that is coaxial with the camshaft 11. Within the wheel 18 is a forwardly extending large front hub 20 and a rearwardly extending smaller rear hub 22. The rear hub 22 abuts the front end of the camshaft front journal 13 and the VCP assembly is enclosed within a housing 23 and cover 24 mounted on the engine front wall 14.

The VCP assembly 15 further includes a stubshaft or spline shaft 26 having an external helical spline 27 at one end and a finished journal 28 at the other. The journal end is secured through a central opening 29 by a screw 30 to the front end of the camshaft with a dowel pin 31 received in openings 32, 34 of the spline shaft 26 and camshaft 11 to maintain a fixed drive relation between the two shafts.

A bowed retaining ring 35, engaging a groove 36 between the spline and journal ends of the spline shaft 26, bears against the sprocket wall adjacent the smaller hub 22 to hold the sprocket hub in position against the camshaft. The axial spring force applied by the bowed ring prevents axial chucking of the sprocket that would otherwise occur when torque reversals on the camshaft are transmitted through the helical splines.

The journal end of the hub 22 is carried for oscillating motion on the journal 28. The splined end of the spline shaft 26 extends forward within the front hub 20 concentric with the inner diameter 38 thereof. A sleeve 39 having an internal helical spline 40 is fitted within the hub 20 and is maintained in fixed driving relation by a drive pin 42 or any other suitable means such as shrink fitting or an adhesive. Use of the splined sleeve insert simplifies manufacturing and shortens the axial length by avoiding the need for an undercut at the inner end of the internal spline. The facing splines 27, 40 have opposite and, preferably, equal leads (or helix angles) to provide for the phasing action to be later described.

Between and engaging both splines are two axially spaced annular drive pistons, called, for convenience, an outer piston 43 and an inner piston 44, the latter being closer to the inner sprocket wall. Both pistons have inner and outer helical splines drivingly mated with the splines 27, 40 of the spline shaft and sleeve respectively.

The splines are misaligned so that when the pistons are urged inwardly toward one another, they engage opposite sides of the mated splines 27, 40 and thus take up the lash that would otherwise occur in transferring drive torque between the sprocket 16 and spline shaft 26. The pistons 43, 44 are urged, or biased, toward one another and maintained in a drive piston assembly 45 by annularly spaced pins 46 press fitted in the inner pistons 44 and having heads 47 compressing wave spring washers 48 in recesses 50 on the far side of the outer pistons 43. The short axial length of the spring washers contributes to the compactness of the VCP 15.

An oil seal 51 formed of a thin sheet of preferably formable material such as an elastomer or oil resistant plastic is mounted against and preferably bonded or otherwise secured to the inside face of the inner piston 44 of assembly 45. The seal 51 may be made with teeth originally mating with the splines 27, 40 with a close or slight interference fit. The teeth are worn or deformed upon installation to closely fitting conformity with their mating splines. In this way a highly effective seal against oil loss through the splines is provided.

As an additional seal, the valleys of splines 44 of the inner piston and its mating external and internal splines 27, 40 may be filled with a deformable or shearable material such as wax, plastic or soft metal to minimize the leak paths therethrough. Alternatively, the deformable material on the splines could be used instead of the thin seal 51. Both means avoid axial extension of the unit to provide an oil seal.

The seal 51 together with the splines 27, 40 and the adjacent wall of the sprocket define an annular chamber 52. Engine oil pressure may be supplied to or discharged from this chamber through connecting oil passages 54 in the spline shaft and 55 in the camshaft journal that leads to an annular groove 56. The groove is connected through schematically illustrated passage means 58 with any suitable form of three-way valve such as solenoid valve 59 which operates to supply pressure oil from an oil gallery 60 or to drain oil to a discharge line 62 while blocking the flow from the gallery 60.

The piston assembly 45 is urged in a direction compressing the chamber 52 by eight (or any suitable number of) coil return springs 63 that extend between the ends of recesses 64 in the inner piston 44 and through the outer piston 43 to an inner face of a cover 66 that is threaded or otherwise retained on the outer hub 20. The arrangement significantly contributes to axial compactness of the VCP.

OPERATION

In operation of the VCP 15 embodiment just described, when the control valve 59 is not energized the valve 59 preferably closes off the gallery 60 and opens the annular chamber 52 to the drain line 62. The springs 63 are thus able to maintain the drive piston assembly 45 at its extreme inner position near the sprocket wall whereby the volume of the annular chamber 52 is held at a minimum. In this position, the camshaft is preferably maintained by the piston assembly 45 in a retarded phase relation with the sprocket for operation of the actuated engine valves under desired retarded timing conditions.

When the engine operating conditions call for advanced valve timing, the solenoid valve is energized, to close off the drain line 62 and open the gallery 60 to supply pressurized engine oil to the annular chamber 52 in the VCP 15. The oil pressure moves the piston assembly 45 against the bias of springs 63 to the extreme opposite position adjacent the cover 66. Because of the opposite lead of the inner and outer helical splines 27, 40, the outward motion of the piston assembly 45 advances the timing or phase angle of the camshaft relative to the sprocket so that the timing of the associated engine valves is likewise advanced.

A return to retarded timing when called for is accomplished by deenergizing the solenoid valve 59, blocking oil flow from the pressure gallery 60 and allowing the VCP annular chamber 52 to drain to line 62. The springs 63 then return the piston assembly 45 to its initial retarded position adjacent the sprocket inner wall.

The use of the three-way solenoid valve 59 to control oil flow has the advantage that oil flow is used only for the purpose of advancing the camshaft timing and is shut off at other times. In this way the capacity and power requirements of the engine oil pump may be lessened. However, any other suitable type of valve and supply arrangement may be used to control the oil flow to and from the annular chamber 52. Also, the valve and oil passages may be arranged in any desired manner and located in any appropriate location to accomplish the purpose without departing from the invention.

In addition to their phase changing function, the pistons 43, 44 of the assembly 45 are also the means through which all torque is transferred from the sprocket 16 to the camshaft 11 and vice versa via their helical splines and the mating splines 27, 40. The misalignment of the piston splines and their biasing toward one another by the pins 46 and wave washers 48 takes up any clearance or lash in the spline connections by urging the pistons 43, 44 into engagement with opposite sides of the engaged splines 27, 40 as was previously described.

Because of this mode of operation, the passing of the return springs 63 through openings, not numbered, in the outer piston 43 to extend between recesses 64 in the inner piston and the inside of the cover 66 has dual benefits. The overall length of the VCP unit 15 is thereby shortened while the length of the return springs remains relatively long to provide for adequate axial motion of the piston assembly 45. In addition, during the return stroke, the pulling of the outer piston 43 behind the inner piston 44 as it is moved inward by the return springs tends to increase slightly the separation of the pistons from one another and thereby reduce the lash take-up force, thus reducing the friction that opposes the return motion of the piston assembly. The required force of the return springs may thereby be reduced.

ALTERNATE EMBODIMENTS

Various alternative embodiments of the invention and its various features may be made within the scope of the disclosed concepts and the appended claims. While not intended to be exhaustive, the following discussion pertains to certain such alternative forms.

Figure 4:
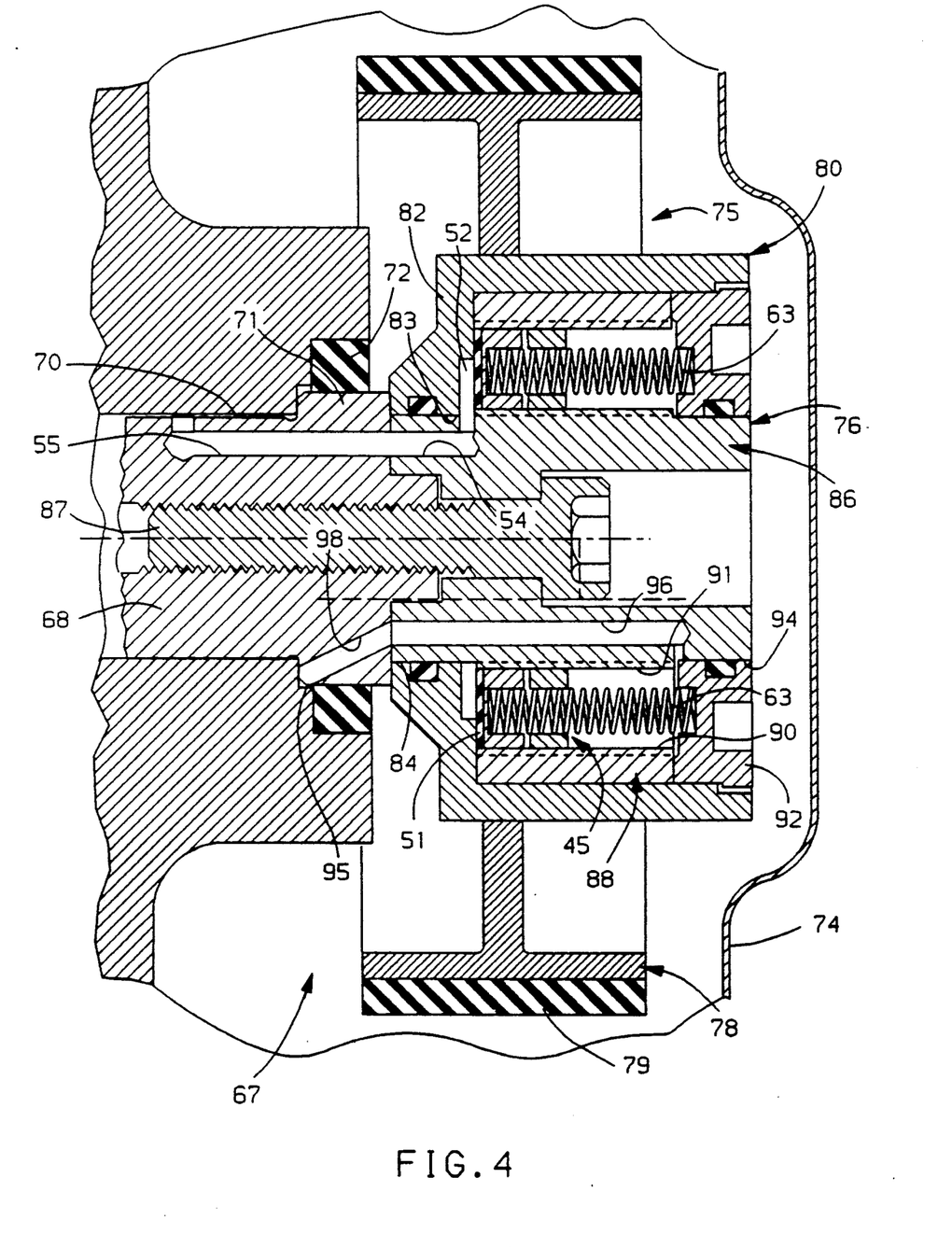
FIG. 4 is a cross-sectional view of an alternate embodiment of VCP applied in a timing belt drive.

FIG. 4 discloses an embodiment of the invention for use with a reinforced rubberlike timing belt drive. Such drive belts are in current use and require an environment that is relatively free of oil. Thus, the engine 67 of FIG. 4 carries a camshaft 68 with a front bearing journal 70 and an outwardly adjacent seal flange 71. A seal 72 engages the flange outer surface to prevent oil leakage into the adjacent camshaft drive housing 74.

A variable cam phaser (VCP) or phase adjuster 75 is mounted on the front end of camshaft. The VCP includes a pulley 76 having an outer toothed wheel 78 driven by a timing belt 79 and connected with an inner hub 80. The hub includes an end wall 82 having a seal carrying central opening 83 that is journaled on a finished journal end 84 of a spline shaft 86. A screw 87 secures the spline shaft to the camshaft in a manner similar to FIG. 1.

Also in the manner of FIG. 1, the hub 80 receives a sleeve 88 having helical internal splines 90 that concentrically oppose helical external splines 91 of opposite lead on the projecting outer end of the spline shaft 86. These splines are engaged by a lash-free piston assembly 45 with oil seal 51 inwardly biased by return springs 63 as in FIG. 1 The springs 63 are seated in an annular cover 92 sealingly secured in the hub 80 and sealingly engaging a seal surface 94 near the end of the spline shaft 80.

The VCP 75 defines an annular chamber 52 which is communicated with a source of pressure oil or drained through passages 54, 55 in the spline shaft 86 and camshaft 68 in the same manner as in FIG. 1. The operation of these portions of the VCP 75 is as was previously described regarding FIGS. 1-3.

In FIG. 4, oil is prevented from escaping onto the timing belt by the sealing contact of the end wall 82 and the cover 92 with the spline shaft 86. Oil that leaks past the piston assembly 45 is drained to space 95 outward of the camshaft seal flange 71 by drain passages 96 and 98 in the spline shaft and camshaft seal flange respectively.

Figure 5:
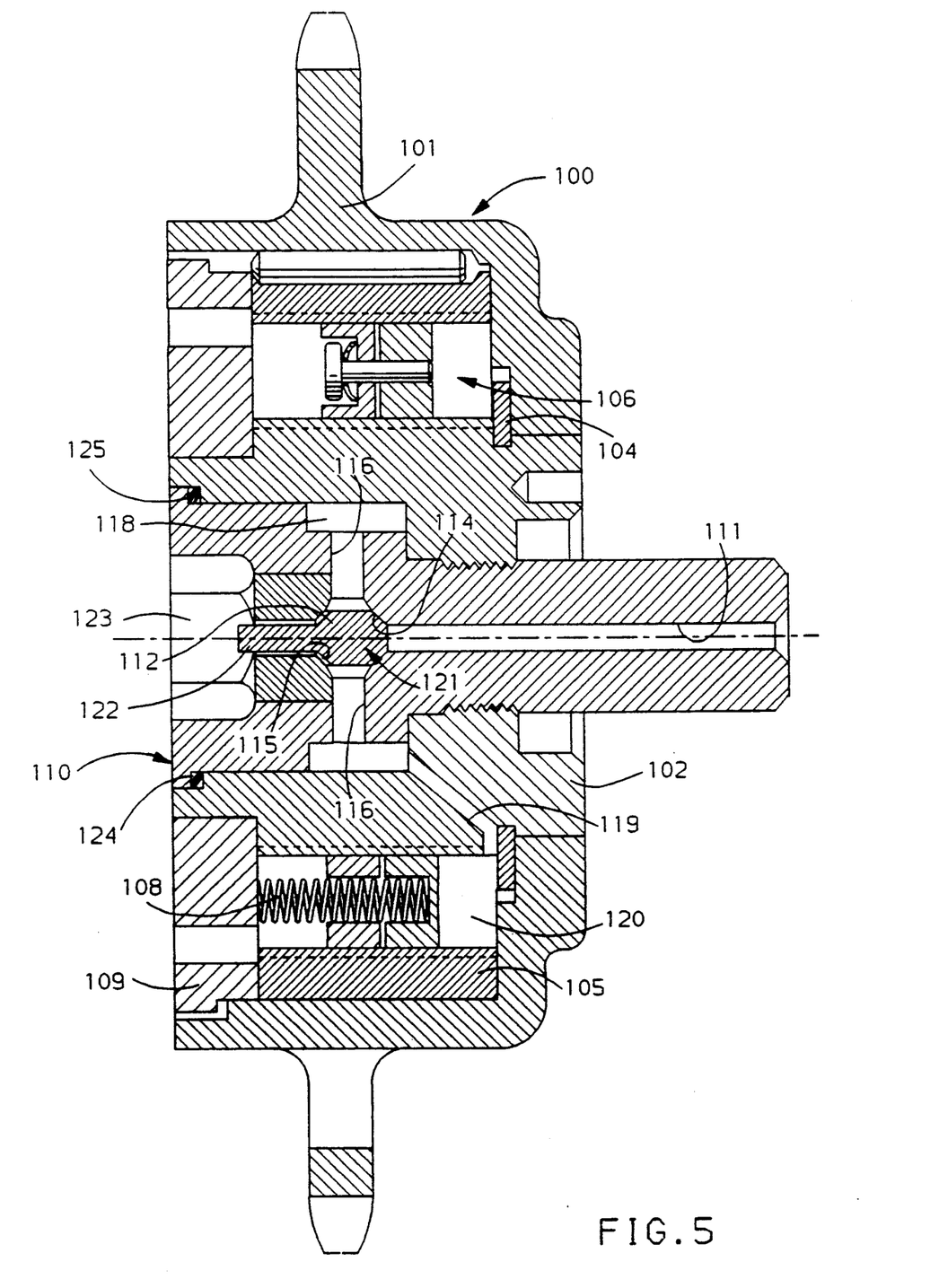
FIG. 5 is a cross-sectional view of a third embodiment of VCP incorporating an internal three way control valve.

FIG. 5 illustrates another embodiment of VCP 100 which includes a sprocket 101, spline shaft 102, retaining ring 104, sleeve 105, drive piston assembly 106, return springs 108 and cover 109 which, though of slightly differing form are the functional equivalents of the corresponding parts of the FIG. 1 embodiment. FIG. 5 differs in that the screw 110 that secures the spline shaft 102 to the camshaft, not shown, also incorporates a three-way oil control valve.

The threaded shank of the screw has an axial feed passage 111 for receiving pressure from a gallery, not shown, in the center of the camshaft. In the base of the head, passage 111 connects with a valve chamber 112 having opposed first and second valve seats 114, 115. Cross passages 116 lead transversely from the valve chamber to an annular space 118 that is connected by a duct 119 to the annular chamber 120 that borders on the piston assembly 106. In the valve chamber is a pintle 121 having a head seatable on the valve seats and a stem 122 extending axially into the socket 123 provided for driving the screw 110. Drain grooves 124 in the seat insert around the stem 122 connect the valve chamber 112 to drain.

A solenoid actuator, not shown, or other suitable actuating means may be mounted on the associated engine in position to engage the stem 122 of the valve pintle 121 when desired. A seal ring 125 around the head of the screw 110 closes a leakage path for pressure oil from the annular space 118.

In operation, the solenoid actuator would preferably be normally biased against the stem 122 with a force sufficient to seat the pintle 121 against the first valve seat 114, thereby cutting off pressure oil flow and discharging any oil in the annular chamber 119 through the drain grooves 124. Energizing the solenoid actuator would release the force on the stem 122, allowing the pintle 121 to be forced off the first seat 114 and seated on the second seat 115 by the force of engine oil pressure in the feed passage 111. This closes the drain grooves 124 and allows pressure oil to flow to the annular chamber 120 to actuate the drive piston assembly 106 in manner previously described. Deenergizing the solenoid actuator would return the system to the previous condition.

The arrangement has the advantage of providing a compact internal control valve for use with applications of the variable cam phaser (VCP) of the invention in appropriate engine configurations.

While the invention is not so limited, it is noted that all of the described embodiments can be assembled prior to installation on an engine and then simply attached (or detached) by use of the single screw which is either left exposed or is covered only by a removable central plug. This allows all the working parts of the VCP unit to be assembled and tested, if desired, at the factory prior to delivery for installation on an engine, rather than having to complete any significant part of the unit during engine assembly.

Although the embodiments so far described have shown the use of inner and outer helical splines of opposite lead, it should be obvious that a combination of straight and helical splines could be substituted if desired. Also inner and outer helical splines of differing lead angles could be used. It would also be possible to substitute other forms of cam-like devices for the splines illustrated while incorporating at least some feature or features of the invention.

HYDRAULIC SYSTEM

Features of hydraulic systems for actuating VCP units according to the invention have been described in relation to FIGS. 1 and 5. Such systems may, of course, have different forms and applications. For example, the three-way valve of FIG. 1 could be replaced by a pair of two-way valves operated by a coordinating control. Also, a three-way or equivalent valve control may be applied to other hydraulic mechanisms and VCP units such as, for example, the VCP unit described in copending U.S. patent application Ser. No. 418,018 filed Oct. 10, 1989 and assigned to the assignee of the present invention.

Figure 6:
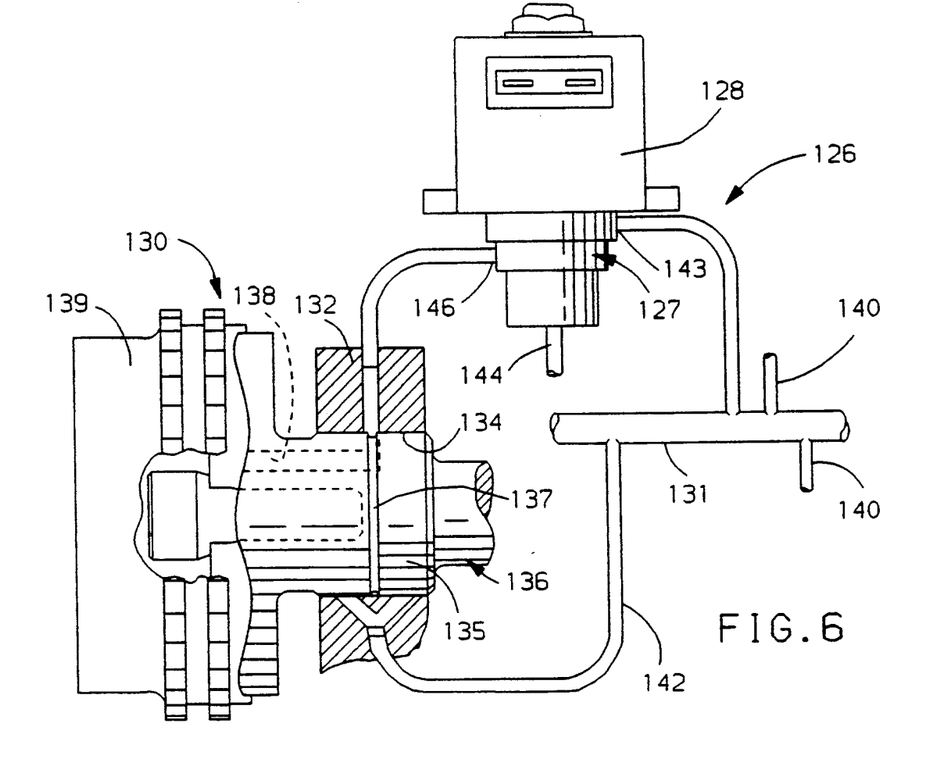
FIG. 6 is a schematic view of a hydraulic system connected to actuate and control a cam phaser.

FIG. 6 illustrates schematically a portion of a VCP hydraulic actuation system generally indicated by numeral 126 and including a three-way valve 127 having a solenoid actuator 128. The valve 127 is mounted on an engine 130 having an oil gallery 131 and a camshaft support 132.

The support forms a bearing 134 for a journal 135 of a camshaft 136 having an annular groove 137 to receive oil. The groove 137 is connected via one or more passages 138 to the actuating chamber, not shown, of an associated VCP 139.

The oil gallery may conventionally have connections 140 to the other engine bearings and hydraulic lash adjusters, if used. In addition, it connects through forked passage means 142 with the bearing on either side of the groove 137 to lubricate the journal 135.

The three-way valve 127 has an inlet port 143 and an exhaust port 144 each connectable to a common port 146. The oil gallery 131 connects with the inlet port 143, the exhaust port 144 connects with the engine oil sump, not shown, and the common port 146 with the groove 137.

Operation of the FIG. 6 embodiment is similar to that of FIG. 1. When the solenoid 128 is de-energized, the valve 127 connects ports 146 and 144 and closes port 143, thus connecting the VCP passages 138 to drain to the oil sump and closing off pressure oil from the gallery 131. Energizing the solenoid 128 closes the exhaust port 144 and connects ports 143 and 146 to deliver pressure oil to the VCP. Thus the volume of oil delivered and exhausted is limited to that needed to fill the VCP actuating chamber each time it is actuated. Loss of oil pressure or the need for a larger pump to supply the VCP system is thereby minimized.

Figure 7:
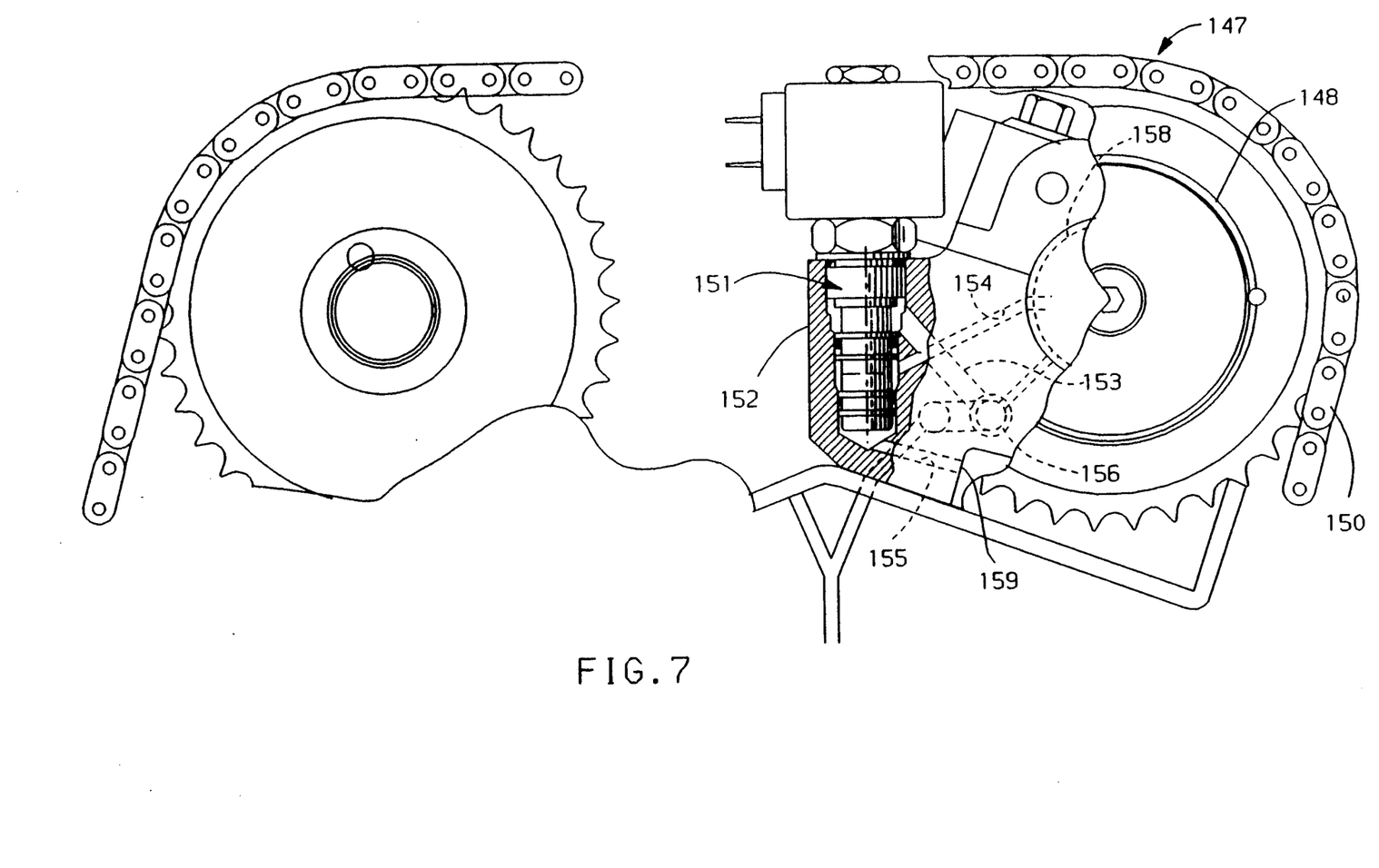
FIG. 7 is an end view partially in cross-section showing a three-way valve engine application.

FIG. 7 shows an application of the system of FIG. 6 to a double overhead cam (DOHC) engine 147. The inlet valve camshaft is driven by a VCP 148 from a chain 150 that also drives the exhaust camshaft. A spool type three-way valve 151 is mounted in the cam carrier or cylinder head body 152 in which the camshaft is carried and passages 153, 154, 155 connect the valve spool with the oil gallery 156, the cam bearing groove 158 and the drain 159 to sump, respectively.

Figure 8:
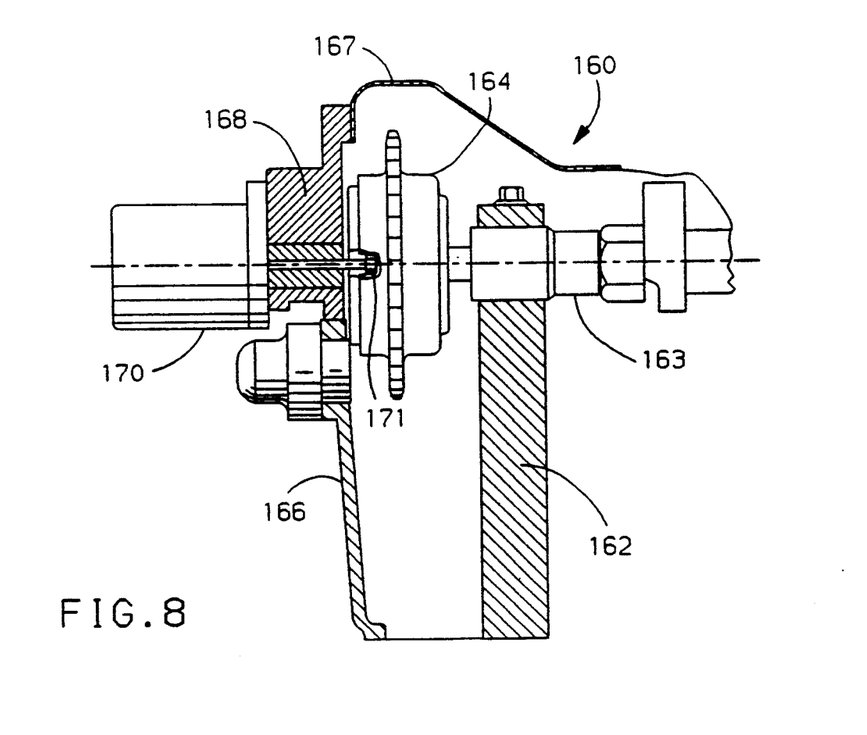
FIG. 8 is a cross-sectional view of an engine with an axially mounted solenoid valve control.

FIG. 8 shows another engine application of a VCP arrangement similar to that of FIG. 5. The engine 160 includes a cam carrier 162 supporting a camshaft 163 driven by a VCP 164 at one end. A chain drive, not shown, for the VCP is enclosed by a lower front cover 166 and an upper cam cover 167. A spacer 168 is mounted on the front of the cam cover and carries a solenoid 170 positioned to actuate a three-way valve, not shown, in a screw 171 similar to screw 110 of FIG. 5.

Figure 9:
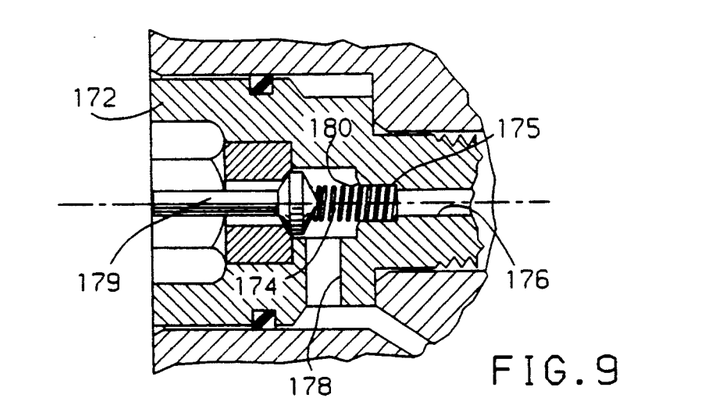
FIG. 9 is a cross-sectional view of a spring biased bolt mounted three-way pintle valve installation.
Figure 10:
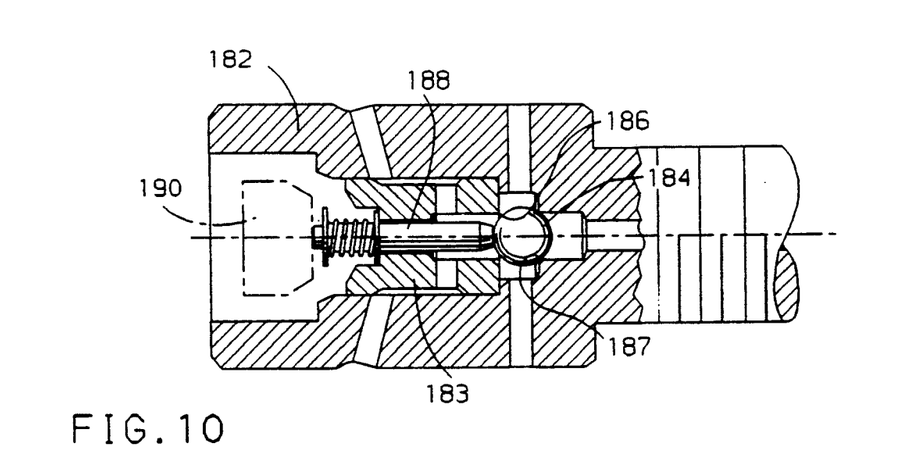
FIG. 10 is a cross-sectional view of a bolt mounted three-way ball valve installation.
Figure 11:
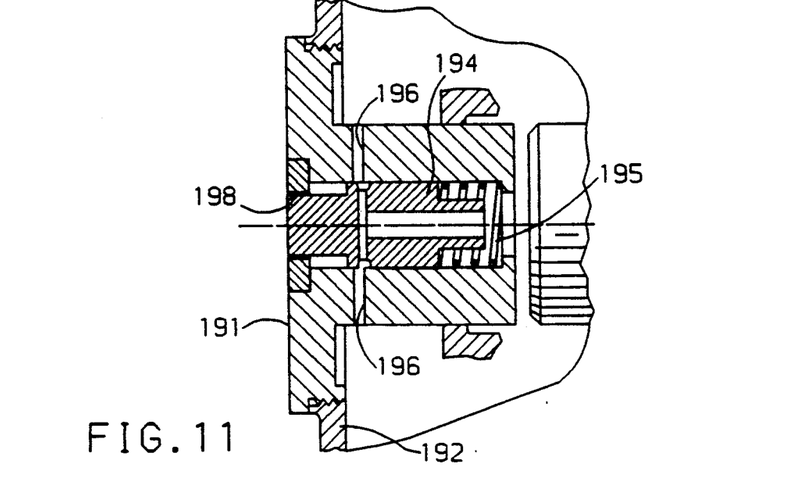
FIG. 11 is a cross-sectional view of a plug mounted three-way spool valve installation.

FIGS. 9-11 show various forms of three-way valves as examples of types that may be used. In FIG. 9, the valve body is a screw head 172 and carries a valve pintle 174 biased toward an open position by a small spring 175. In this position, pressure oil from a central passage 176 is connected through ports 178 to the VCP actuating chamber. The stem 179 of the pintle is engaged by a solenoid, not shown, to move the pintle against a seat 180 to shut off the oil pressure and connect the ports 178 to drain through passages around the stem 179.

FIG. 10 shows a similar oil flow arrangement in which the screw head 182 has an insert 183 that traps a ball 184. The ball is seatable on one seat 186 to allow actuating oil flow and against a second seat 187 to drain the actuating chamber. A spring biased pin 188 carried by the insert 183 transmits the motions of a solenoid plunger 190 to the ball 184.

In FIG. 11, the valve body is a plug 191 carried in the camshaft cover 192. A spool type valve element 194 in the plug is biased outwardly by a spring 195 to connect pressure oil to an outer chamber through ports 196. Inward movement of the valve element 194 cuts off the pressure oil and connects the ports 196 to drain through a central opening 198 in the plug 191.

While the invention has been described by reference to certain preferred embodiments, it should be understood that numerous changes could be made within the spirit and scope of the inventive concepts described. Accordingly it is intended that the invention not be limited to the described embodiments, but that it have the full scope permitted by the language of the following claims.

What is claimed is:

1. A variable phaser wherein drive and driven members are drivingly connected by phase changing means defining an expansible actuating chamber for receiving pressure hydraulic fluid for positioning the phase changing means, and
    a three-way valve alternately connecting the chamber with one of a pressure oil supply and a drain and concurrently closing the connection with the other of said supply and drain,
    wherein said three-way valve is carried in a screw, threaded into a rotary member and receiving pressure oil therefrom, said screw also fixing said driven member to the rotary member.

2. A variable phaser as in claim 1 wherein the three-way valve is one selected form the group consisting of a ball valve and a pintle valve.

3. A camshaft connected with a variable cam phaser wherein drive and driven members are drivingly connected by phase changing means defining an expansible actuating chamber for receiving pressure hydraulic fluid for positioning the phase changing means, and a three-way valve alternately connecting the chamber with one of a pressure oil supply and a drain and concurrently closing the connection with the other of said supply and drain, wherein said three-way valve is carried in a screw, threaded into a rotary member and receiving pressure oil therefrom, said screw also fixing said driven member to the rotary member.

4. A combination as in claim 3 wherein the three-way valve is one selected from the group consisting of a ball valve and a pintle valve.

5. A variable phaser wherein drive and driven members are drivingly connected by phase changing means defining an expansible actuating chamber for receiving pressure hydraulic fluid for positioning the phase changing means, and three-way valve means alternately connecting the chamber with one of a pressure oil supply and a drain and concurrently closing the connection with the other of said supply and drain, wherein said three-way valve means is carried in a fastener, secured to a rotary member and receiving pressure oil therefrom, said fastener also fixing said driven member to the rotary member.

6. A combination as in claim 5 wherein said rotary member comprises a camshaft.

* * * * *